United States Patent
Terry et al.

(10) Patent No.: US 7,036,140 B2
(45) Date of Patent: Apr. 25, 2006

(54) CAPACITY SCALING AND FUNCTIONAL ELEMENT REDISTRIBUTION WITHIN AN IN-BUILDING COAX CABLE INTERNET ACCESS SYSTEM

(75) Inventors: John B. Terry, deceased, late of Cumming, GA (US); by Dorothy Terry, legal representative, Cumming, GA (US); Jeffrey A. Hales, Suwanee, GA (US)

(73) Assignee: Arris International, Inc., Suwanee, GA (US)

( * ) Notice: Subject to any disclaimer, the term of this patent is extended or adjusted under 35 U.S.C. 154(b) by 1067 days.

(21) Appl. No.: 09/933,323

(22) Filed: Aug. 20, 2001

(65) Prior Publication Data

US 2002/0059634 A1 May 16, 2002

Related U.S. Application Data

(63) Continuation-in-part of application No. 09/818,378, filed on Mar. 27, 2001, and a continuation-in-part of application No. 09/482,836, filed on Jan. 13, 2000.

(60) Provisional application No. 60/226,505, filed on Aug. 21, 2000, provisional application No. 60/193,855, filed on Mar. 30, 2000, provisional application No. 60/115,646, filed on Jan. 13, 1999.

(51) Int. Cl.
*H04N 7/173* (2006.01)

(52) U.S. Cl. .................. 725/120; 725/80; 725/82; 725/83; 725/126; 725/127

(58) Field of Classification Search ............ 725/75–85, 725/120, 126, 127, 128

See application file for complete search history.

(56) References Cited

U.S. PATENT DOCUMENTS

| 4,677,467 A | 6/1987 | Hayes |
| 5,301,186 A | 4/1994 | Galuszka et al. |
| 5,488,412 A | 1/1996 | Majeti et al. |
| 5,499,047 A * | 3/1996 | Terry et al. ................. 725/127 |
| 5,642,155 A | 6/1997 | Cheng |
| 5,742,607 A | 4/1998 | Beighe et al. |
| 5,805,591 A | 9/1998 | Naboulsi et al. |
| 5,864,747 A | 1/1999 | Clark et al. |
| 5,923,361 A | 7/1999 | Sutton, Jr. |
| 5,935,209 A | 8/1999 | Budhraja et al. |
| 5,959,658 A | 9/1999 | Gnauck et al. |
| 6,028,860 A | 2/2000 | Laubach et al. |
| 6,065,049 A | 5/2000 | Beser et al. |
| 6,088,785 A | 7/2000 | Hudson et al. |

(Continued)

OTHER PUBLICATIONS

Publication by Goldberg, Lee, entitled *MCNS/DOCSIS MAC Clears a Path for the Cable-Modem Invasion*, Communications Technology, pp. 69-70, 74, 78, 80, (Jan. 12, 1997).

(Continued)

*Primary Examiner*—John Miller
*Assistant Examiner*—Shirley Chang

(57) ABSTRACT

A set of system configurations adapted to provide data communications to and from a set of client modems connected to one or more central modems through a tree and branch network such as exists in buildings, hotels, multiple dwelling units and the like to distribute cable television signals to individual rooms. The set of one or more central modems is connected directly or indirectly to one or more networks such as the Internet. Optionally, some components of this system can be placed at the cable television head-end for ease of access for maintenance.

14 Claims, 12 Drawing Sheets

U.S. PATENT DOCUMENTS

| | | | |
|---|---|---|---|
| 6,151,559 A | 11/2000 | Williams | |
| 6,178,161 B1 | 1/2001 | Terry | |
| 6,216,171 B1 | 4/2001 | Isono et al. | |
| 6,313,851 B1 | 11/2001 | Matthews, III et al. | |
| 6,389,029 B1 | 5/2002 | McAlear | |
| 6,418,149 B1 * | 7/2002 | Swisher et al. | 370/487 |
| 6,421,714 B1 | 7/2002 | Rai et al. | |
| 6,477,179 B1 | 11/2002 | Fujii et al. | |
| 6,481,013 B1 * | 11/2002 | Dinwiddie et al. | 725/80 |
| 6,526,581 B1 * | 2/2003 | Edson | 725/74 |
| 6,581,208 B1 * | 6/2003 | Inaguma | 725/149 |
| 6,848,116 B1 * | 1/2005 | Land | 725/78 |

OTHER PUBLICATIONS

*Data-Over-Cable Service Interface Specifications—Cable Modem to Custom Premise Equipment Interface Specification, Cable Television Laboratories, Inc.* SP-CMCI-102-980317, 40 pages, (Mar. 17, 1998).

US 2002/00-42845 A1, *Burnmann et al., Automation System and Connecting Apparatus for the Transparent Communication Between Two Networks*, (published Apr. 11, 2002).

*Brain, Marshall, Howstuffworks.com, How Modems Work*, (Dec. 5, 1998) http://web.archive.org/web/19990422184428/www.howstuffworks.com/modem.htm (5 pages).

\* cited by examiner

CAPACITY SCALING AND FUNCTIONAL ELEMENT REDISTRIBUTION WITHIN AN IN-BUILDING COAX CABLE INTERNET ACCESS SYSTEM

The present application claims priority from co-pending U.S. Provisional Application Ser. No. 60/226,505 filed on Aug. 21, 2000.

The present application claims priority from co-pending U.S. patent application Ser. No. 09/818,378 for Architecture and Method for Automatic Distributed Gain Control for Modem Communications which in turn claims priority from U.S. Provisional Application Ser. No. 60/193,855 filed on Mar. 30, 2000.

This application also claims priority from co-pending U.S. patent application Ser. No. 09/482,836 for High Speed Data Communications Over Local Coaxial Cable which in turn claims priority from U.S. Provisional Application Ser. No. 60/115,646 filed on Jan. 13, 1999.

To reduce repetition with the material disclosed in the '836 application, the '836 application is incorporated by reference. For the convenience of the reader, applicant has added a number of topic headings to make the internal organization of this specification apparent and to facilitate location of certain discussions. These topic headings are merely convenient aids and not limitations on the text found within that particular topic. In order to promote clarity in the description, common terminology for components is used. The use of a specific term for a component suitable for carrying out some purpose within the disclosed invention should be construed as including all technical equivalents which operate to achieve the same purpose, whether or not the internal operation of the named component and the alternative component use the same principles. The use of such specificity to provide clarity should not be misconstrued as limiting the scope of the disclosure to the named component unless the limitation is made explicit in the description or the claims that follow.

BACKGROUND

The demand for High-Speed Internet Access (HSIA) is driving the telecommunications industry like few forces have in the past. While the Cable and Telephone industry position their networks for the future, ever-changing technology has previously made it both costly and risky to invest in new delivery systems.

Most current approaches for delivery of internet services in MDUs ("Multiple Dwelling Units") utilize telephone wiring in "data above voice" configurations. Such approaches usually require selective identification and disconnection of each telephone pair and the insertion of a modem function at the central end of the telephone loop. Such intrusive installation is both costly and time consuming. A second modem is required at the user end of the telephone pair to connect to the user's PC ("Personal Computer") or in-home network. Since MDU telephone wiring generally has a worse inter-pair crosstalk performance than that of outside wiring and suffers considerable electrical ingress interference, data is usually inserted on the telephone loop within the building to ensure adequate performance. The high frequency loss of longer telephone loops between the central office and the MDU considerably limits potential two-way transmission speed for longer telephone loops.

The use of low-cost wireless data transmission works well where the distances are short and spectrum is abundant. However, for densely populated MDUs, this is not usually the case.

THE PRESENT CABLE ENVIRONMENT

Cable modem Internet service has now penetrated well over one million residences and has become extremely popular due to its exceptional speed. However, the introduction of cable modem service in MDUs is problematic due to the complex and irregular topology of the TV coax wiring and the sharing of limited available upstream bandwidth. In addition, points of ingress interference in MDU coax distribution and home wiring are very difficult to locate and particularly difficult to isolate. Such ingress interference can cause failure of two-way services to all users in an MDU and potentially other users upstream of the MDU on the Hybrid Fiber-Coax (HFC) network.

Both cable modem and telephone loop data modems are usually interfaced to the PC using an Ethernet 10baseT connection. This requires that a Network Interface Card (NIC) be installed in each PC and the PC network software configured. Since average PC users are not usually technically skilled, this installation and/or configuration is frequently performed by the Cable or Telephone network provider. In this way, the network provider becomes potentially liable for problems in the PC, often when the trouble is not related to the network provider's work. While this issue can be alleviated in some cases by use of USB ("Universal Serial Bus standard") ports, a large proportion of PCs are not so equipped. In hotel/motel situations, users do not generally require networking between themselves and are rarely adept or willing to reconfigure their PCs each time they rent a room or return to their home or office.

Coax distribution systems such as those found in MDUs, hotels, hospitals, and university campus facilities, which can be served by Cable, Satellite or Broadcast network operators, are usually configured as passive "tree and branch" systems using splitters and/or relatively long coax runs with taps or couplers arranged to serve the apartments or rooms. Such passive distribution arrangements frequently serve from 30 to 100 rooms or apartments and are arranged such that the TV signal levels fed to each apartment or hotel room are typically within a 10 dB range. These coax distribution systems typically have losses in the range of 15 dB to 45 dB (at typical MDU TV service frequencies) and are usually fed from a centralized one-way broadband TV channel amplifier to ensure adequate signal levels for the users. Larger high-rise MDUs and hotels usually have a number of centralized amplifiers each feeding a passive coax distribution subsystem serving separate areas or floors of the building.

THE OPPORTUNITY

The spectrum utilized for MDU TV services usually lies below 750 MHz, whereas the components used in the distribution of these services, such as coax cable, can handle frequencies beyond 1 GHz. Passive splitters and couplers (collectively called "joiner devices"), although usually only rated for use in the TV bands, generally perform adequately in terms of loss and/or port isolation when carrying robust digital signals of up to 1 GHz. When operating at these frequencies, the loss per unit length of the in-building coax wiring, rather than being a problem, helps attenuate echoes thus permitting the use of much simpler equalization in digital receivers.

In addition, ingress interference is very much less at frequencies above those of TV channels, and being contained by the one-way characteristic of the central TV channel amplifiers—at least at the TV downstream channel frequencies and higher, any ingress interference is prevented from exiting the MDU and interfering with the HFC cable network.

Based on this evidence, there is clearly an opportunity to utilize the higher frequency spectrum of an in-building distribution system for coax based services, such HSIA services using robust digital modulation techniques. The spectrum available above TV channels in in-building coax can be arbitrarily divided up to offer high-speed data in both directions. Due to the relatively high field-strength radiation of portable cellular handsets, it is prudent to operate at frequencies of 900 MHz and above, although not a requirement. Using presently installed splitters and couplers it is also better to keep to frequencies of 1 GHz and below. This available 100 MHz of available spectrum is plenty to serve the statistical two-way Internet access needs of 50 to 100 users or client modems. If higher capacity is needed, additional downstream spectra can be allocated in bands between 1 GHz and about 1.6 GHz provided that higher frequency specified splitters are substituted; higher capacity can also be obtained by moving down in the frequency spectrum. Such higher uni-directional capacity can provide for additional digital video-on-demand (VOD) services, in either Internet Protocol (IP) format or in native MPEG2 format. The frequencies within the range of 850 MHz to 950 MHz are useful in most preferred embodiments for upstream transmission. The use of this single upstream spectrum provides adequate traffic capacity and simplifies control.

BRIEF SUMMARY OF DISCLOSURE

This disclosure builds on the teachings of the '378 and the '836 applications referenced above which takes advantage of the topology and performance of a in-building coax distribution to provide HSIA services. More specifically, this disclosure adds to the previous disclosures by identifying a number of shared coax distribution Internet access configurations to promote economical capacity scaling and topological re-distribution of functions aimed at extending the breadth of application and economical deployment of Internet access and other data/telephony and video services within hotels, large and small multi-dwelling/multi-tenant environments.

It is an object of the present invention to distribute data to a set of local modems at the distal end of a multipoint network such as coaxial tree and branch cable television distribution network to allow for the two way communication between devices connected to the local modems and a set of one or more central modems while making use of existing distribution network components used for the distribution of cable television signals.

It is a further object of this invention to provide options for efficient capacity scaling to compensate,for increases in one or more types of data over the multipoint network.

It is a further object of this invention to provide options for moving one or more functions from the building with the distribution network to the cable head-end in order to reduce costs and maintenance trips to the individual building.

These and other advantages of the present invention are apparent from the detailed description that follows.

BRIEF DESCRIPTION OF THE DRAWINGS

FIG. 9 uses a splitter 506 as shown in FIG. 3 in order to use a single central modem 520 to service several sparsely loaded networks (320, 321, and 322).

FIG. 12 also illustrates that the system may be attached to a Local Area Network 568.

DETAILED DESCRIPTION OF THE DISCLOSED EMBODIMENT

Architecture

Figure 1:
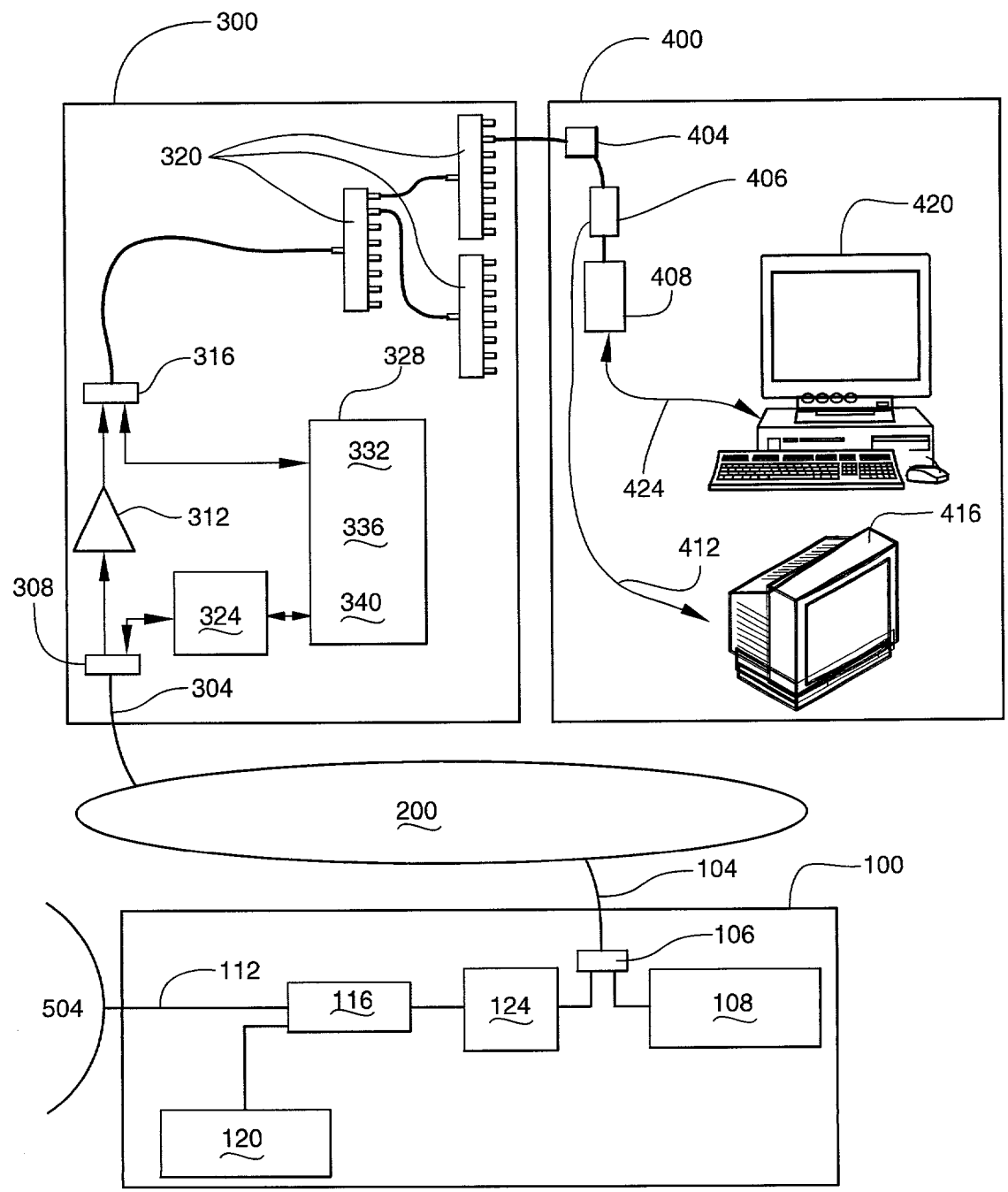
FIG. 1 is provided for reference purposes and illustrates the basic system as described in co-pending U.S. patent application Ser. No. 09/818,378 for Architecture and Method for Automatic Distributed Gain Control for Modem Communications.

FIG. 1 illustrates the overall architecture. FIG. 1 can be subdivided into four clusters of components. The first cluster is Cable-TV (CATV) head-end equipment 100. The second cluster is the Hybrid Fiber-coax (HFC) Distribution Network 200. The third cluster is the premises coax distribution equipment 300 which could exist in either an MDU or an analogous situation such as a hotel. The final cluster is the cluster of equipment in the user's room 400. Clusters 300 and 400 contain elements of the present invention. In keeping with industry conventions, the CATV head-end and the Internet are the upstream end of FIG. 1 for cable TV and IP data respectively. The television set or computer in the user's room are the downstream points. Upstream data transmissions travel upstream towards the upstream end. Downstream transmissions travel downstream towards the downstream end. Thus a component on a data path receives a downstream data transmission from its upstream end and an upstream data transmission from its downstream end.

The contents of the individual clusters are described below. In cluster 100, a cable TV signal is provided to the HFC distribution network 200 via connection 104. The source of the cable TV signal may be from conventional equipment represented by CATV Service Elements 108 connected to one leg of joiner device 106. Digital communication signals from Internet 504 travel through Internet connector cable 112 to Router 116, which is in communication with Internet Service Management 120. The digital communication signals pass through the Cable Modem Termination System 124 and joiner device 106 when moving downstream from the Router 116 to the connection 104 to the HFC Distribution Network 200. The description of selected elements of the CATV head-end is to provide context for the present invention and does not constitute a limitation or required elements for the present invention.

In cluster 300, the incoming signal from the HFC Distribution Network 200 is carried on cable 304 to joiner device 308 such as a directional coupler. The joiner device 308 is connected to the input of TV Channel Amplifier 312. The Output of TV Channel Amplifier 312 is passed to the low pass port of a diplexer 316 and then to set of one or more joiner devices forming the tree and branch distribution network 320 terminating at a series of TV coax Receptacles 404. Note that care must be taken in selecting diplexers so that the operating range of the diplexer includes the relevant range above the frequencies normally used for cable television channels.

The technology for tree and branch networks suitable to distribute Cable TV signals is well known to those of skill in the art. Thus, in order to avoid unnecessary clutter, the tree and branch network 320 is shown with just a few joiner devices and connecting cables rather than the full set of components for a tree and branch network. In a typical application the tree and branch network 320 would be connected to 50 or more coax receptacles 404.

Joiner device 308 and diplexer 316 form a parallel path around the TV Channel Amp 312. This parallel path has a cable modem 324 at the upstream end and data hub 328 ("hub") at the downstream end of the parallel path. Thus the use of the splitter and combiner allows signal to go to the TV Channel amp 312 and the cable modem 324. 316 is used to combine the amplified CATV signal and the data signal to pass them together down to the distribution network. As described in the '836 application referenced above and in the text below, the data hub 328 performs several functions for the various client modems 408. Several major functions of the hub are represented in FIG. 1 as Network Interface Card ("NIC") 340, Protocol Converter 336, and RF Modem 332. The hub 328 handles the buffering for both the upstream and downstream communications as well as managing the various client modems so that there is not bus contention on the upstream channel.

Within cluster 400, a client modem 408 connects to a diplexer 406. A diplexer 406 is connected to the coax receptacle 404. A conventional TV coax cable 412 to connects a television 416 to the low pass port on the diplexer 406. A client modem 408 is connected to the high pass port on the diplexer 406. In subsequent figures the client modem 408 is shown as a sand dollar in deference to the assignee's name for this device. The user may connect a downstream device 420 to the data cord 424 of client modem 408 with the appropriate port connector for connection to the user's downstream device 420 such as a personal computer ("PC") as shown in FIG. 1. While the downstream device 420 is likely to be either a desktop or laptop personal computer, it could be some other device capable of interfacing with an external source of digital data. One such example is the range of devices known as PDAs ("Personal Digital Assistants"). Thus, the present invention allows for communication between the downstream device 420 and the Internet 504 through substantial use of existing infrastructure used to deliver cable TV signals to user's television 416.

In this arrangement, a single DOCSIS-compliant off-shelf cable modem 324 is used to serve the statistical data needs of multiple users connected via a passive in building coax distribution system.

At the user or client ends of the system a very simple modem interface is used to interface to the user's computer 420 via its existing serial, parallel or USB port. In this way, no NIC card or network configuration is required in the users PC. Point-to-Point Protocol (PPP) is carried on RF channels on the in-building coax distribution 320 to a central RF modem 332 within the hub 328. Note that PPP is the current preferred embodiment but other protocols can be used in lieu of PPP.

A protocol converter 336 is provided between this central RF modem 332 and the shared DOCSIS-compliant cable modem 324. This protocol converter 336 translates the data format between the Point-to-Point Protocol (or some other protocol) used by the PC and the IP used by the DOCSIS Cable modem's Ethernet port. Thus any IP protocol, such as TCP/IP, UDP/IP, etc., is carried transparently to and from the Internet 504. Special prioritization is available for low-latency requirement traffic, such as IP voice or multimedia, in both directions of transmission.

The protocol converter 336 also acts as a proxy server (if required) in order to connect the many client modems and their PCs to one or a few DOCSIS-compliant cable modems (to avoid clutter, FIG. 1 shows a single cable modem). This involves providing IP addresses to the PCs in response to PPP connection requests. The protocol converter 336 translates single or multiple socket addresses that uniquely identify multiple sessions or windows running within each PC, in order to present unique socket addresses to servers that exist on the IP network 504.

If desired, the many client-PC's can be made to appear, from a head-end service management perspective, as though they are connected via individual cable modems. Thus a function is provided in the head-end that collects associated user-PC MAC and assigned IP address information from the protocol converter and presents this as an interface to Internet head-end service management 120 that also manages single-user cable Modem services.

RF Transmission

One embodiment uses 15 Msymbol/sec Binary Phase Shift Keying ("BPSK") or Quadrature Phase Shift Keying ("QPSK") modulation in a single downstream "channel" with a center frequency of approximately 970 MHz. Higher symbol rates are planned which could offer at least 30 Mb/s net downstream data capacity. Current embodiments use center frequency of 980 MHz to 985 MHz. The specific center frequency is not critical as long as it is in the band of frequencies set forth in this description and is not subject to interference from other sources.

The downstream signal is transmitted continuously and formatted in a standard MPEG2/DVB structure. The MPEG2 frames comprise a framing (47 hex)/superframing (inverted 47 hex) byte, 187 information bytes and 16 forward error correcting (FEC) bytes—a total of 204 bytes. Certain reserved MPEG2 "Packet IDentification" (PID) codes are used to indicate that the following information bytes are data of a particular type rather than digital video or idle frames.

Conventional synchronized scrambling is employed for spectral reasons and the 16-byte FEC field is always used or reserved for error correction. These structures facilitate the use of the same industry-standard off-shelf set-top technologies in both data and digital TV applications. Frame interleaving, while available, is not used in in building passive coax distribution as this would delay latency-sensitive traffic and is not necessary for error protection purposes.

In one embodiment, upstream transmission in the in-building coax uses a BPSK modulated 915 MHz RF signal carrying a 15 Mb/s digital stream. Upstream transmission is only permitted from one client modem at a time as specified by downstream "polling" contained in the downstream data control envelope. Thus, there is no collision of upstream signals. The upstream signal comprises a preamble signal that is ramped up in level followed by a sync byte. A scrambled client modem source address, a length field and then data follow this preamble. The length of the data field is dependent on how much is requested by the central modem or the remaining amount of upstream data buffered in the client modem. As in the downstream direction, special provision is made for the needs of low-latency traffic.

Coax Path Loss Compensation

Path losses between each client modem 408 and the central RF modem 332 will have a wide variation due to the coax distribution topology and loading variations. The system is designed to accept losses of 40 dB or more.

Loss variations in the downstream direction are compensated by an automatic gain control ("AGC") function contained in each client modem receiver.

The upstream AGC method involves adjusting each of the client modem transmitters such that their signals, upon arrival at the upstream receiver in the central modem, are approximately equal.

Each time a data burst is sent to a client modem 408 an extra bit is included which indicates if the previous transmitted burst from that client modem was above or below the ideal level required at the receiver within the central RF modem 332. This bit is used by the client modem 408 to slightly adjust, either upward or downward, the level of its next transmitted burst. Thus all signals received by the central RF modem 332 from every client modem become aligned in level and cycle upward and downward by a small amount. This is an ideal situation since the upstream BPSK receiver has a much wider acceptable input signal range than the small level variations received. Control systems of this type are fast to react to changes in transmission path attenuation and are intrinsically stable.

Technologies

One embodiment of the present invention uses available low-cost, commercial RF and digital technologies. Alternative embodiments include a client modem receiver that uses tuner/demodulator chipsets commonly used in satellite set-top boxes.

One alternative embodiment calls for moving most functions into a pair of custom chips; one a small RF analog chip, the other a semi-custom chip containing the digital functions. This technology evolution will result in a client modem the size of a small cellular phone that may become part of a coax cord assembly and consume very little power.

The hub 328 is presently constructed using a normally rack-mounted, low cost, PC motherboard equipped with an RF/protocol board 336 and one or more 10baseT NIC interfaces 340. This may be mounted, together with one or more off-shelf cable modems 324, on a wall adjacent to the existing building TV distribution amplifier 312. Those of skill in the art recognize that a variety of server platforms choices exist, which can be configured with or without disks.

Installation

As illustrated in FIG. 1, the central installation requires only the addition of two coax joiner devices 308 and 312 to which are attached a conventional cable modem 324 and the hub 328. The client modems are simply introduced, by the end-user, between the TV coax receptacle 404 and TV set 416 (if any). An associated transformer cube (not show in FIG. 1) is then plugged into a convenient power receptacle and the data cord 424 plugged into the user's PC. No network-stack configuration of the PC is required, thus offering a real plug-and-play high-speed Internet access service.

Summary of Basic Configuration

The system presents an economic approach for MDU or hotel high-speed Internet access that works well over existing in-building coax.

This system is DOCSIS-compliant as seen from the head-end networking elements, consistent with existing cable modem operation and service practices and yet offers easy end-user attachment without PC reconfiguration or installation of an Ethernet NIC card in the user's PC. The per-MDU common equipment installation is extremely simple and there is no need for a truck-roll or appointment to provide service to each customer. Indeed, client modems can be mailed and are easier to hook-up than a VCR.

The approach isolates internal MDU ingress interference from the main HFC network and provides improved bandwidth management and efficiency, particularly in the upstream or return direction.

Multi-megabit Internet access is achieved via the PC's existing parallel or USB port using a simple "enabler" that places a connection icon on its desktop and activates the PC's existing PPP direct connection facility. The "enabler" can be loaded from the hub 328 via the PC's existing serial connector—no floppy disks or CDs.

Alternative Configurations

Figure 2:
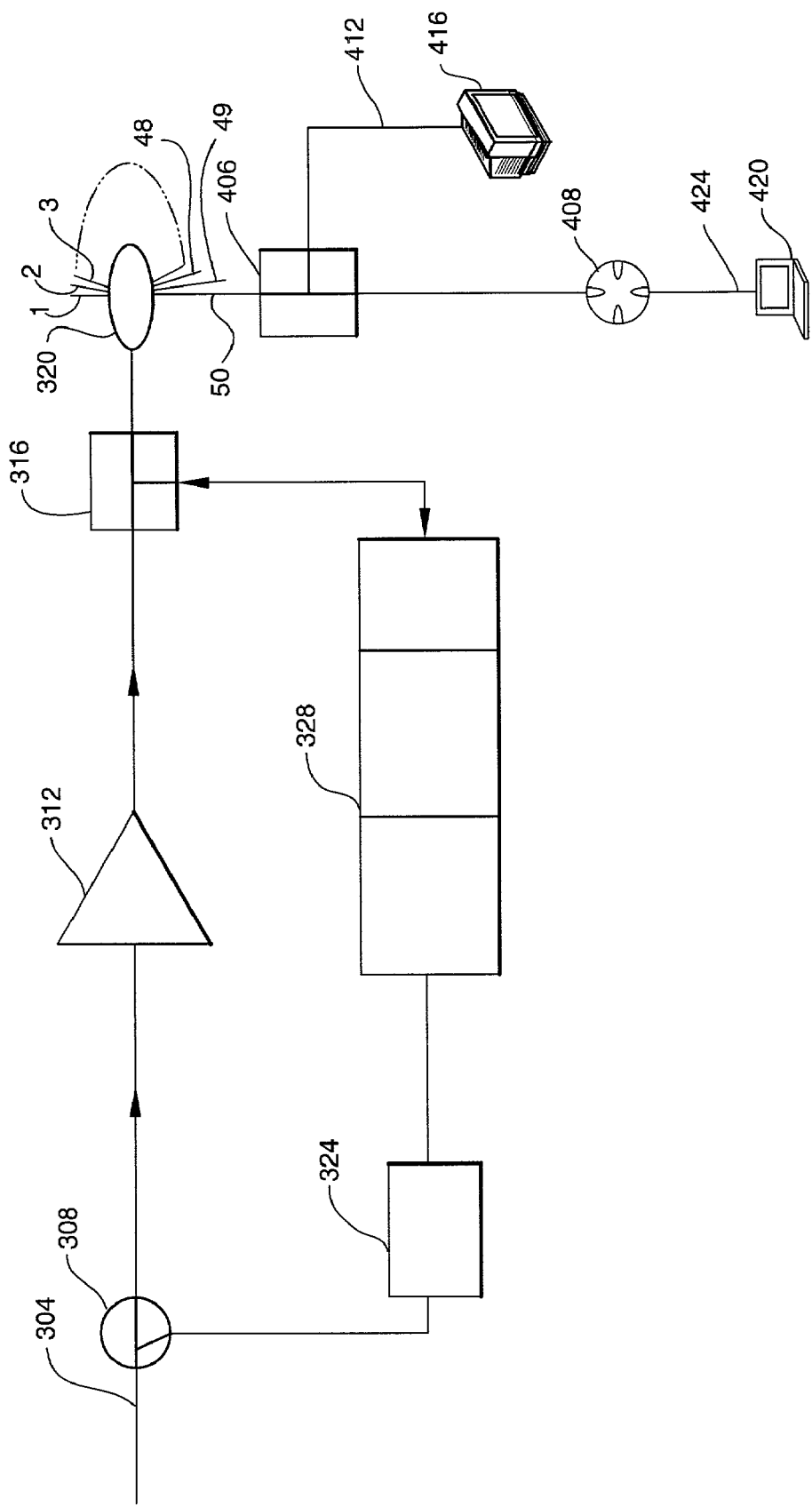
FIG. 2 is a simplified version of a portion of FIG. 1 whose functional drawing elements are re-used within FIGS. 3 to 12.

In order to highlight the differences between the base configuration described above and a variety of alternative configurations, FIG. 2 is a simplified version of the relevant portion of FIG. 1. Note that the multiple levels of splitters found in tree and branch network 320 are shown simply as a single element with 50 terminal branches. In FIG. 2, the coax distribution network 320 is shown with branches 1, 2, 3, 48, 49, and 50 labeled. Subsequent depictions of coax distribution networks will merely show lines representing the multitude of terminal branches. The specific number 50 is provided simply to illustrate the environment and does not form a limitation of the present invention.

Figure 3:
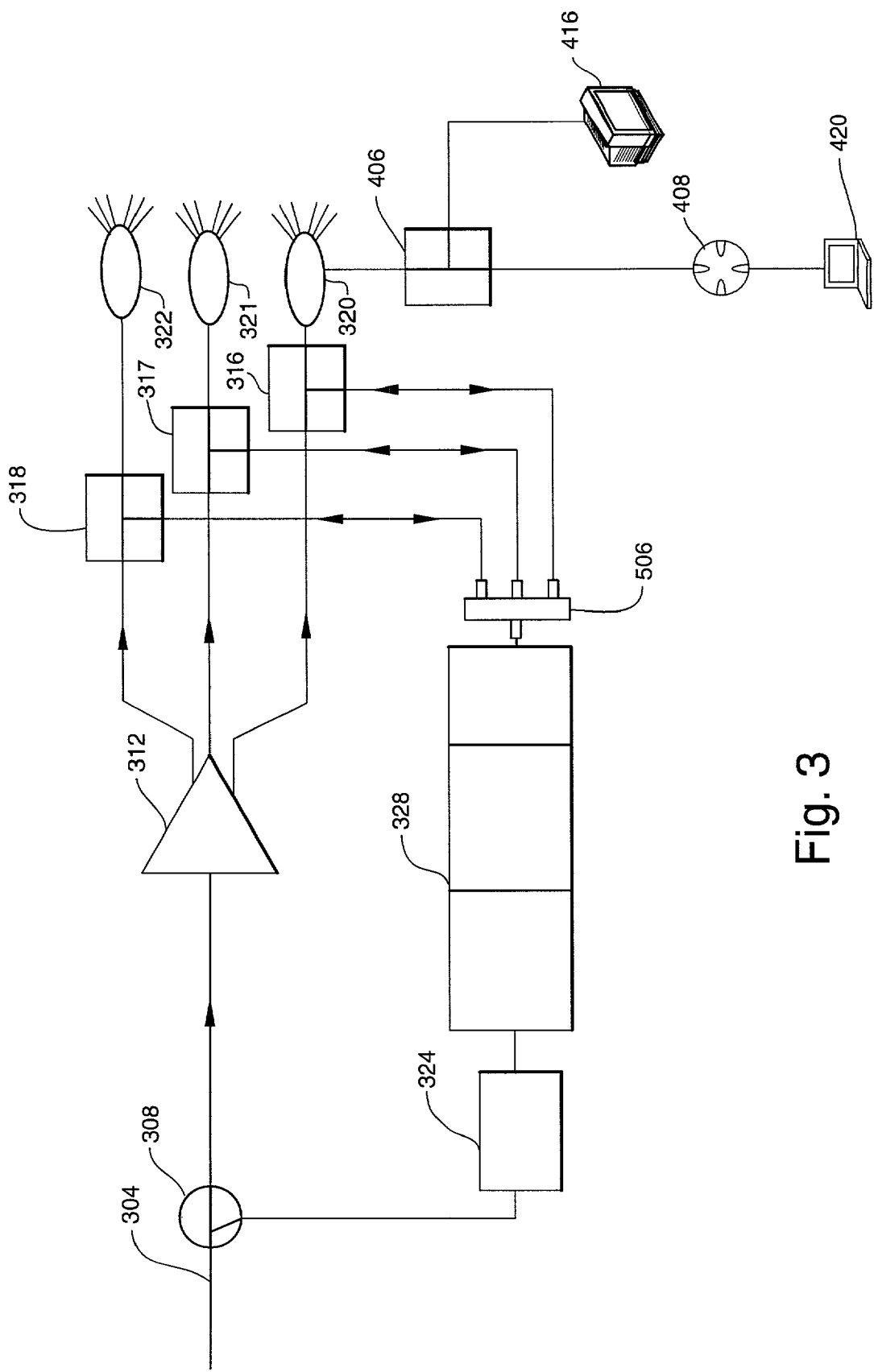
FIG. 3 shows how the hub 328 can be connected via a splitter 506 to three separate diplexers (316, 317, and 318). The diplexers combines the output of the hub 328 and the output from the TV channel amplifier 312 to provide Internet service from the single hub 328 and CATV service from the amplifier 312 to a number of separate passive coax distribution networks (320, 321, and 322).

FIG. 3 shows how the hub 328 can be connected via a splitter 506 to three separate diplexers (316, 317, and 318). The diplexers connect the hub 328 and the output from the TV channel amplifier 312 to provide Internet service from the single hub 328 to a number of separate passive coax distribution networks (320, 321, and 322). This arrangement provide a very economical distribution to a large number of rooms or living units when the percentage subscription is low or where the capacity of service per user is managed to a lower data rate—with a potentially lower tariff. Note that the use of three diplexers and three passive coax distribution networks is for purposes of illustration. This arrangement would work with two or more diplexers/distribution networks as long as the aggregate use of the hub 328 was within the engineering limits of the hub and an acceptable quality of service for the end users. Note further, that the invention does not rely on the use of a single TV channel amplifier 312. The amplification could be performed by a series of amplifiers or by a set of parallel amplifies such that not all diplexers receive an amplified television signal from the same TV channel amplifier.

Figure 4:
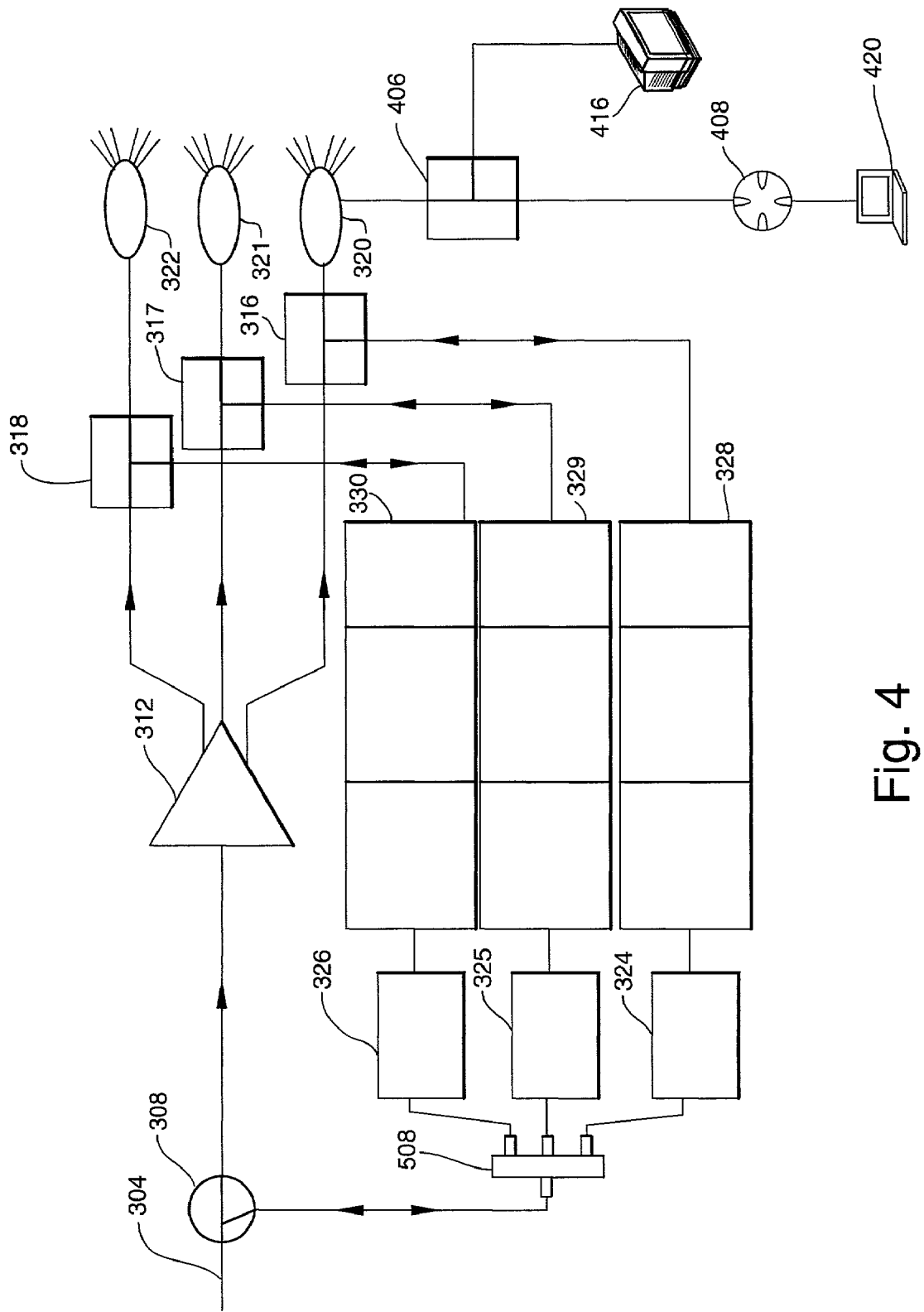
FIG. 4 shows a very high capacity configuration in which the Internet backhaul service is provided via three pairs of cable modems and hubs (324/328, 325/329, and 326/330) by splitter 508. Thus, each of the three small distribution networks (320, 321, and 322) has it's own cable modem and hub (324/328, 325/329, and 326/330).

FIG. 4 shows a very high capacity configuration in which the incoming Ethernet signal transmission are distributed to three pairs of cable modems and hubs (324/328, 325/329, and 326/330) by splitter 508. Thus, each of the three small networks (320, 321, and 322) has its own cable modem and hub (324/328, 325/329, and 326/330). FIG. 4 might be appropriate for a relatively high usage rate such as 20 users per 50 port network.

Note again that the invention is not limited to configurations with only three pairs of cable modems and hubs. There could be any number of two or more. The configuration of FIG. 4 could be combined with the configuration of FIG. 3 to allow several low usage/low quality of service networks to share one hub while other high usage/high quality of service networks operate off a separate modem/hub pair.

Figure 5:
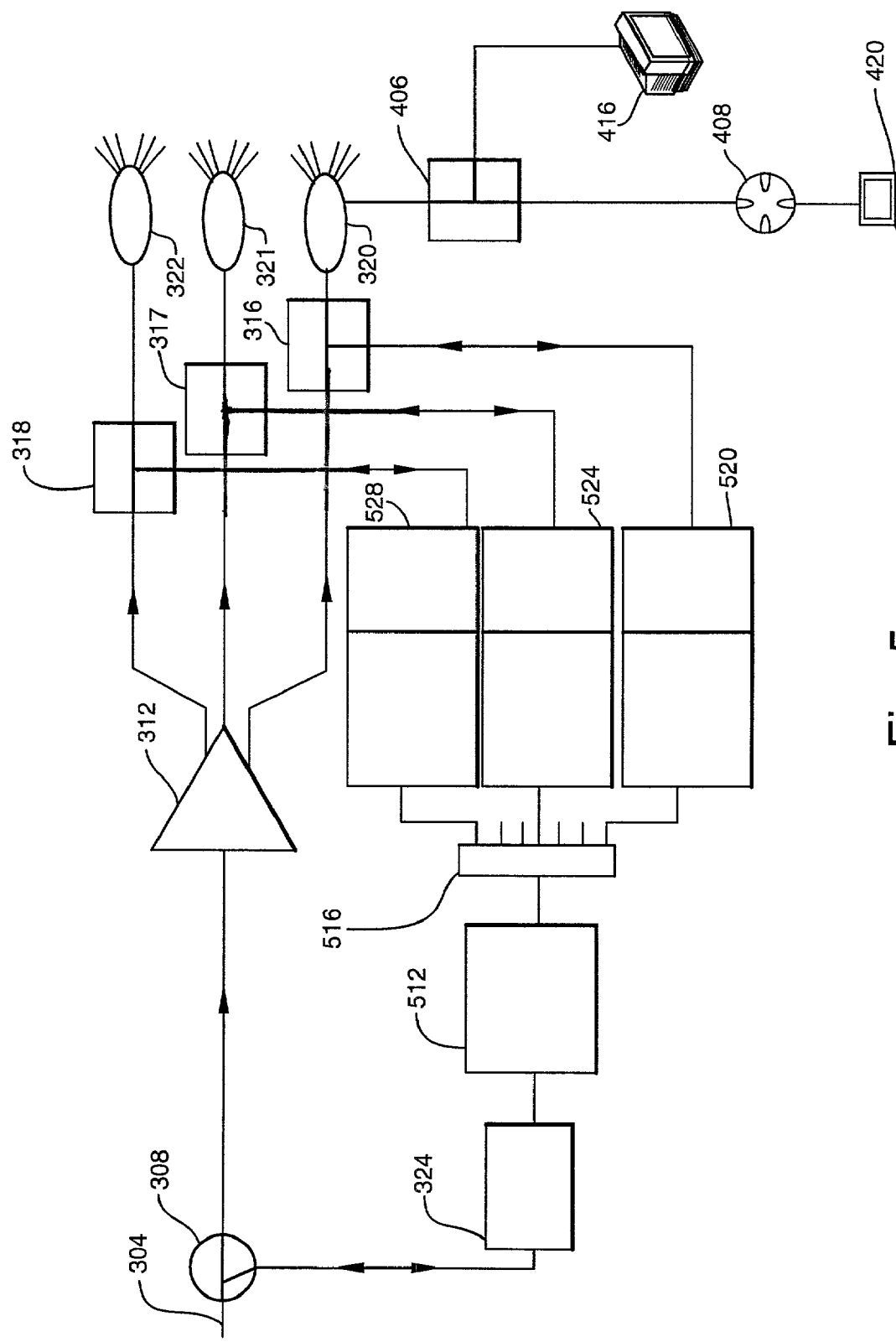
FIG. 5 shows a configuration where the combination of functions performed by the hub 328 (FIGS. 1–4) can be divided across a central server 512 and multiple server-modems (520, 524, and 528) through use of a router or switch 516 connecting the central server to the server modems.

FIG. 5 shows a configuration where the combination of functions performed by the hub 328 (FIGS. 1–4) can be divided across a central server 512 and multiple server-modems (520, 524, and 528) through use of a router 516 connecting the central server to the server modems. In one preferred embodiment the allocation of functions is as follows. The central server 512 performs the conversion of Ethernet to PPP over Ethernet (PPPoE), when required, and other local value-add functions. The individual server-modems (520, 524, and 528) perform the tasks associated with polling the client modems and buffering the data in addition to the modulating and demodulating tasks. An acceptable piece of equipment for use as the router 516 is a Linksys Router Model BEFSR41 (manufactured by Linksys of Irvine, Calif. 92614). Those of skill in the art can substitute other routers or suitable switches.

The configuration in FIG. 5 offers an economical approach and allows, for example, local communication between users served from separate passive coax distribution systems. While the system illustrated in FIG. 3 intrinsically provides local communication between passive coax distribution networks, the system illustrated in FIG. 5 offers much higher capacity for local communications.

Figure 6:
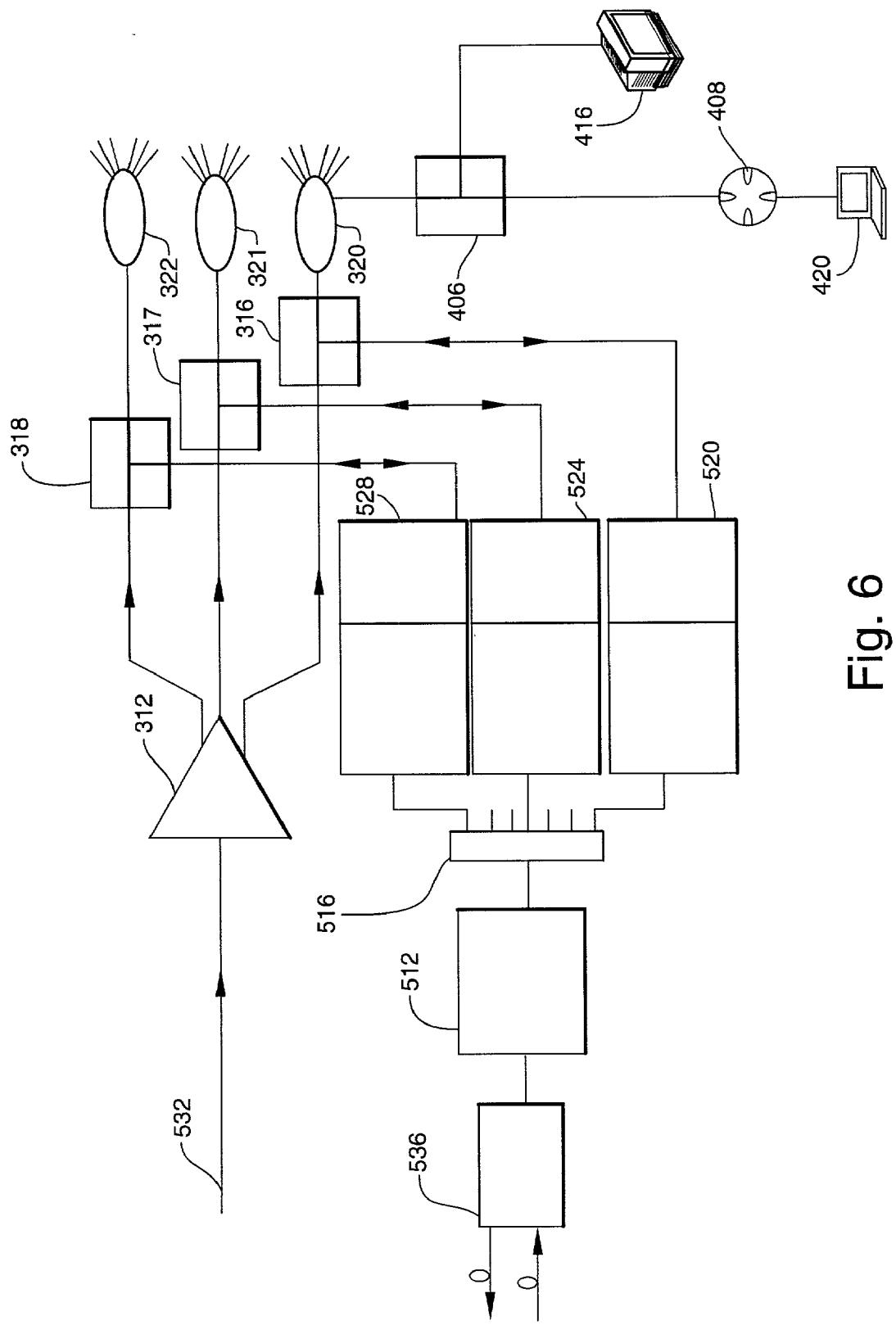
FIG. 6 uses a configuration similar to FIG. 5 but has independent sources for TV and Internet backhaul services. Rather than have one source that provides both, as shown by cable 304 in FIGS. 1–5, FIG. 6 receives the TV signal from source 532 and connects with the Internet via fiber interface 536.

FIG. 6 uses a configuration similar to FIG. 5 but has independent sources for TV and Internet backhauls. Rather than have one source that provides both as shown by cable 304 in FIGS. 1–5, FIG. 6 receives the TV signal from source 532 and connects with the Internet via fiber interface 536.

Figure 7:
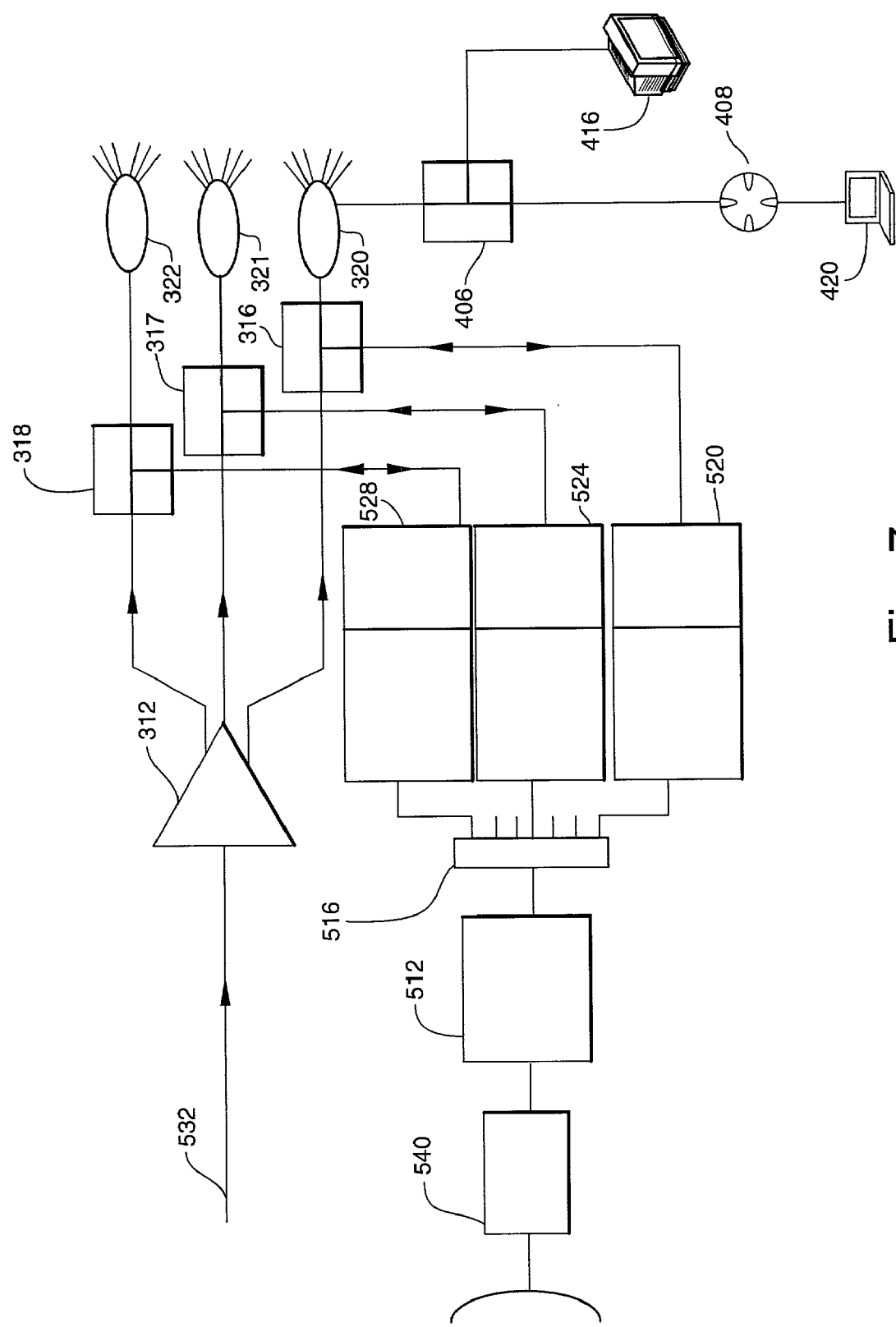
FIG. 7 uses a configuration similar to FIG. 5 but has independent sources for TV and Internet backhaul. Rather than have one source that provides both as shown by cable 304 in FIGS. 1–5, FIG. 7 receives the TV signal from source 532 and connects with the Internet via wireless interface 540.

FIG. 7 uses a configuration similar to FIG. 5 but has a split source of TV and Internet. Rather than have one source that provides both as shown by cable 304 in FIGS. 1–5, FIG. 7 receives the TV signal from source 532 and connects with the Internet via wireless interface 540.

Figure 8:
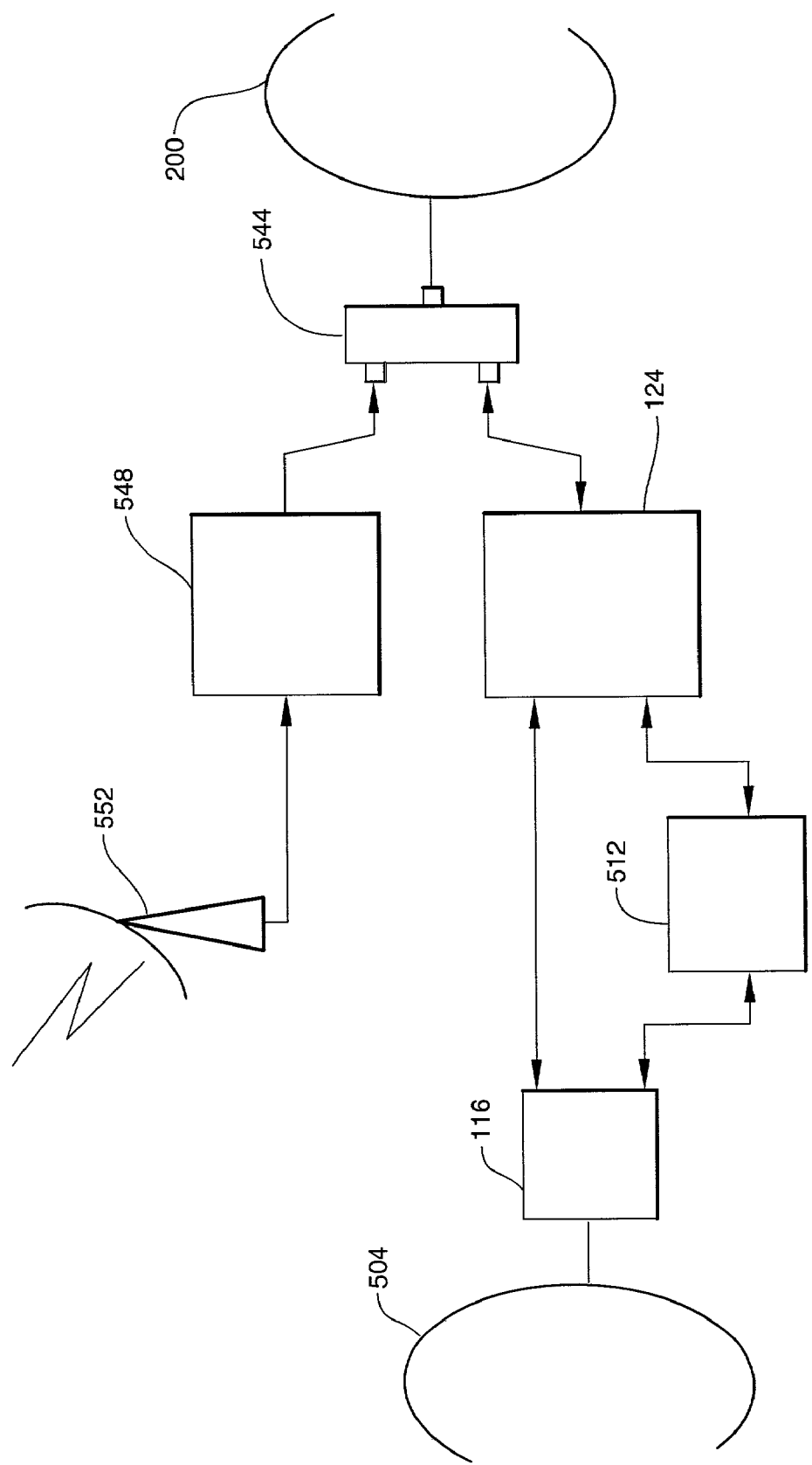
FIG. 8 illustrates a cable head-end containing a coaXmedia server, which has been migrated from a small hotel or small MDU system in order to reduce costs and maintenance trips.

FIG. 8 illustrates a cable head-end that contains a central server 512 that has been migrated from a small hotel or small MDU system in order to reduce costs and maintenance trips. This has particular value in garden-home MDU environments where each building has perhaps only 8 or so living units. It should be noted that the protocol carried via the cable modem (or other means) can be PPP over Ethernet or Ethernet. This PPPoE protocol is a public standard.

More specifically, FIG. 8 shows a hybrid fiber-coax CATV network 200 connected to coupler 544. One port of the coupler 544 is connected to a TV channel modulator bank 548 that is connected to an antenna 552. Another port on the coupler 544 is connected to a cable modem termination system (CMTS) 124. The CMTS 124 is connected to router 116 that is connected to Internet 504. A second parallel path between the CMTS 124 and the router 116 runs through the central server 512 that performs the conversions between Ethernet and PPP over Ethernet and other value-add functions. The description of selected elements of the CATV head-end is to provide context for the present invention and does not constitute a limitation or required elements for the present invention, but provides context for the placement of the central server at the CATV headend.

Figure 9:
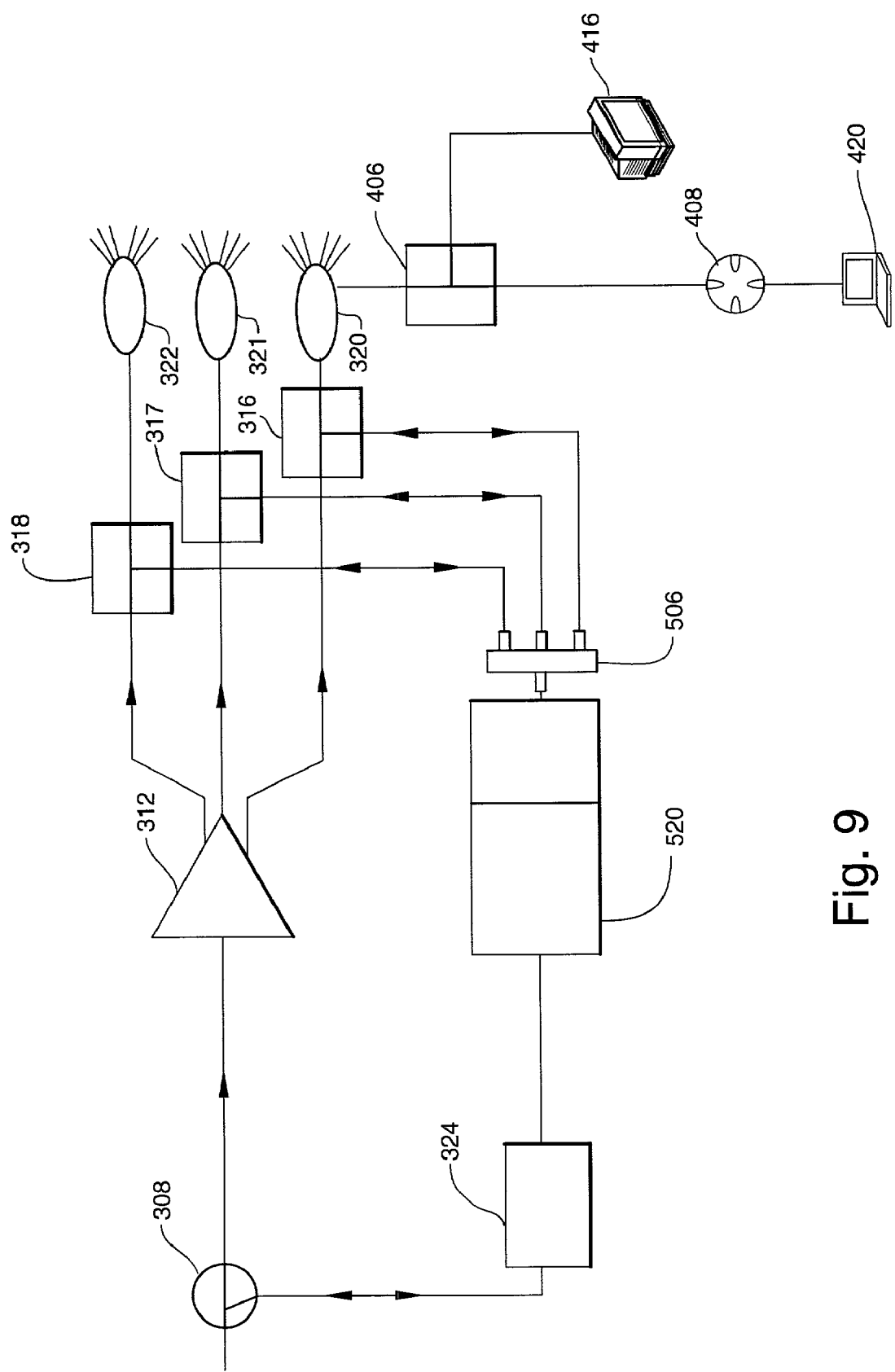
FIG. 9 shows a serverless configuration that may be used in conjunction with the head-end shown in FIG. 8.

FIG. 9 shows a serverless configuration that may be used in conjunction with the head-end shown in FIG. 8. FIG. 9 uses a splitter 506 as shown in FIG. 3 in order to use a single central server 520 to service several sparsely loaded networks (320, 321, and 322).

Figure 10:
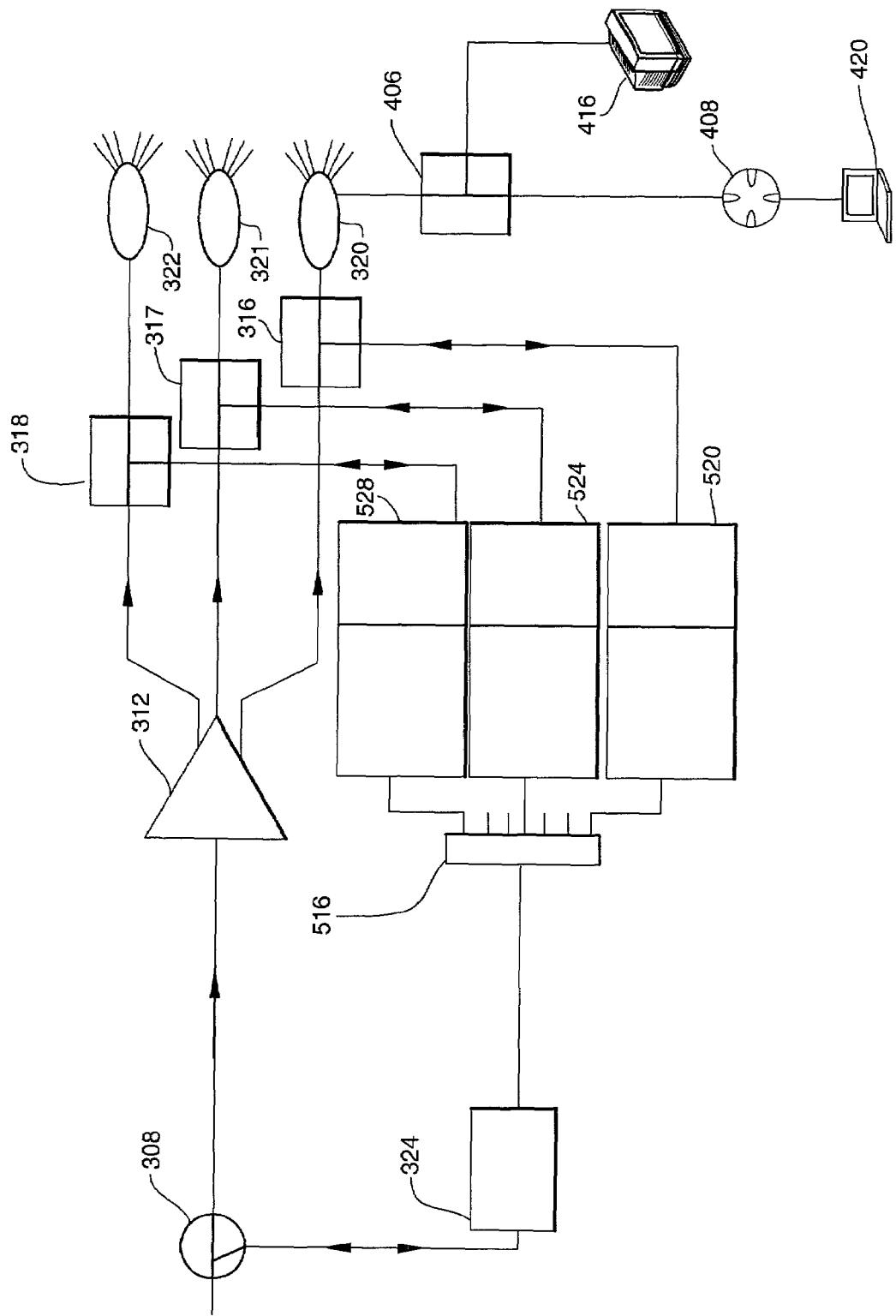
FIG. 10 illustrates an alternative configuration for use with a cable head-end such as shown in FIG. 8, using a router or switch to connect the Internet backhaul to several central modems.

FIG. 10 illustrates an alternative configuration for use with a Cable head-end such as shown in FIG. 8. FIG. 10 can be modified to include a local MPEG-2 video server (not shown) whose traffic may be interleaved with that of Internet data. Such an application justifies very high local capacity in a situation where the access backhaul is of limited capacity, such as that provided by a single cable modem.

Figure 11:
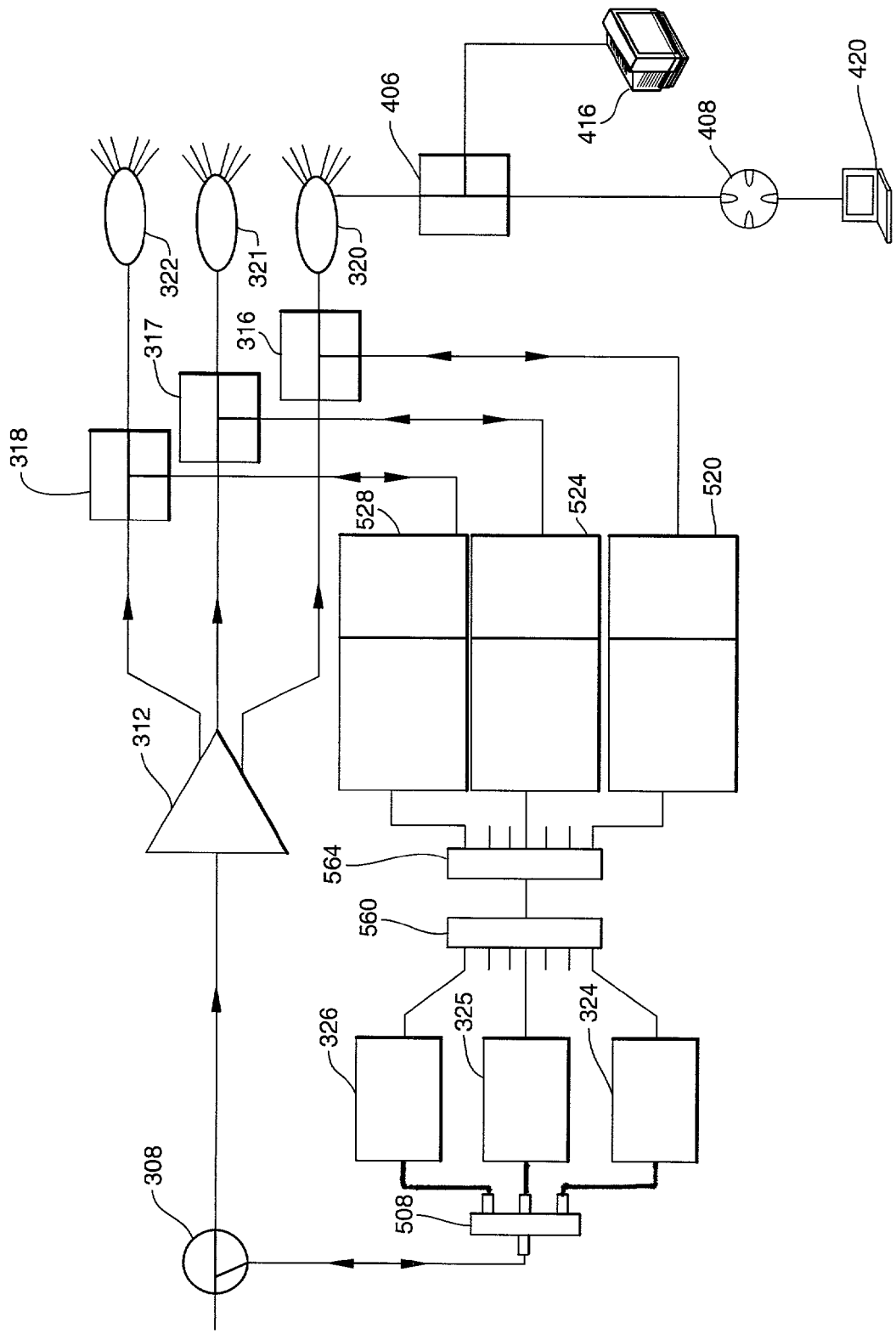
FIG. 11 illustrates that multiple cable modems (324, 325, and 326) may be used to increase backhaul capacity.

FIG. 11 illustrates that multiple cable modems may be used to increase backhaul capacity. In contrast to FIG. 4, a bank of aggregation routers 560 and 564 lie between the set of cable modems (324, 325, and 326) and the set of central modems (520, 524, and 528). Depending on the type of router used each user's traffic may be aggregated across multiple cable modems or, alternatively, groups of users may be assigned to particular modems—either automatically according to usage or under the control of a traffic manager. Note that the ratio of cable modems to central modems does not need to be one to one under this configuration.

Figure 12:
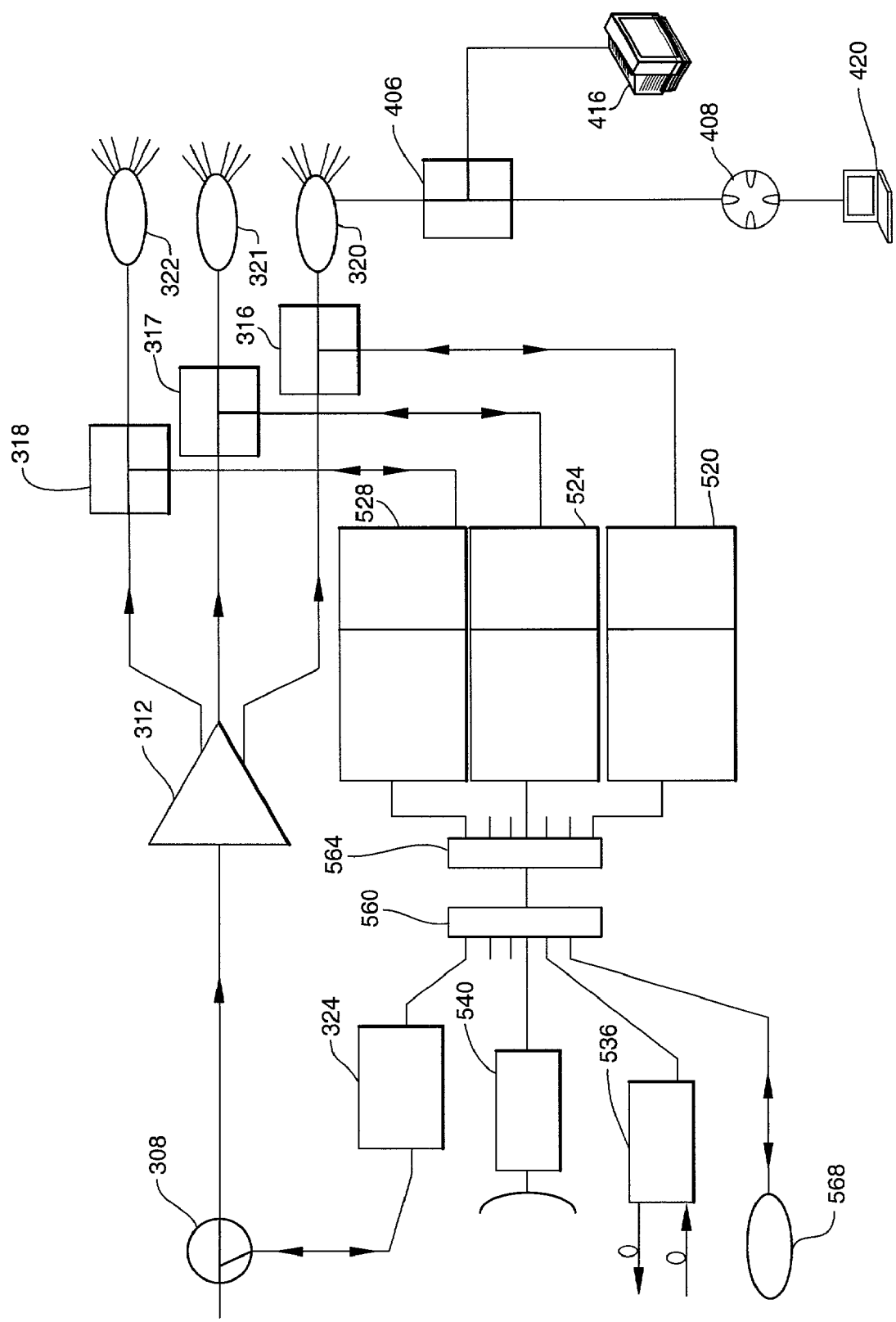
FIG. 12 illustrates that the backhaul may be achieved by a mix of cable modem 324, fiber interface 536, and wireless interface 540.

FIG. 12 illustrates that the backhaul may be achieved by a mix of: a cable modem 324, a fiber interface 536, and a wireless interface 540. Those of skill in the art will recognize that other interfaces may be used within the scope of this invention. For example the cable modem could be replaced by one or more xDSL modems. FIG. 12 also illustrates that the system may be attached to a Local Area Network 568. An example of this configuration could be that of a university dormitory application in which the users require access to their university laboratory/office network and Internet access for web browsing, web entertainment services or perhaps video teleconference services.

Concluding Remarks

Those skilled in the art will recognize that the methods and apparatus of the present invention has many applications and that the present invention is not limited to the specific examples given to promote understanding of the present invention. Moreover, the scope of the present invention covers the range of variations, modifications, and substitutes for the system components described herein, as would be known to those of skill in the art. For example, an alternative embodiment of the disclosed topologies can use Ethernet or some other communication protocol for the communications with the user's computer 420. PPP over Ethernet (PPPoE) is the current preferred protocol but this will vary over time as the functionality present in laptop computers evolves. Thus, for example, element 512 in FIG. 5 might not perform a conversion from Ethernet to PPPoE but would still perform the local value add functions.

The figures described above are designed to illustrate at a high-level the functional elements in system layouts. The drawings are not intended to set forth which components exist in separate boxes and which are combined in a common box. For example, FIG. 5 shows elements 512, 516, 520, 524, and 528 as separate elements. These elements may be part of a common box with some elements existing as cards in the box.

The invention was disclosed in context of one or more passive distribution networks. Those of skill in the art will recognize that the present invention can be applied to a network with certain active devices by bypassing the active devices in a matter analogous to what was done to effectively route the data transmissions around the television channel amplifier 312.

The legal limitations of the scope of the claimed invention are set forth in the claims that follow and extend to cover their legal equivalents. Those unfamiliar with the legal tests for equivalency should consult a person registered to practice before the patent authority which granted this patent such as the United States Patent and Trademark Office or its counterpart.

The invention claimed is:

1. An architecture of components within a building to distribute television signals and data over an in-building coax distribution network to provide television signals to a set of at least two televisions and to provide for two-way data communication between at least one hub and a set of at least two client modems attached at the distal ends of the in-building coax distribution network, the architecture comprising:
   a) A network connection connecting the building to an external network, the cable carrying data pertaining to communications with the set of at least two client modems;
   b) A cable carrying television signals in a first frequency band;
   c) At least one signal amplifier for amplifying television signals in the first frequency band from the cable calming television signals, the output of the at least one signal amplifier provided to at least one diplexer, the downstream leg of the at least one diplexer connected to the in-building coax distribution network;
   d) at least one hub connected to the in-building coax distribution network through the at least one diplexer, the hub:
      1. comprising at least one central modem for transmitting Internet Protocol data downstream to the set of client modems and for receiving upstream transmissions of Internet Protocol data from individual client modems, the upstream and downstream transmissions—occurring in frequency bands above the first frequency band,
      2. buffering the upstream and downstream communications for the in-building coax distribution network;
      3. controlling the use of the upstream channel on the in-building coax distribution network by the set of at least two client modems; and
      4. acting as a proxy server for the at least two client modems; and
   e) at least one network access device for
      1. transmitting data upstream to the external network from one of the at least one hubs, the hub having received the data transmission from one of the client modems and the client modem having received the data from a device downstream of a particular client modem, and
      2. receiving downstream transmissions of data from the external network for conveying to the at least one hubs which in turn conveys the data to the client modems for use by at least one device downstream of a particular client modem.

2. The architecture of claim 1 further comprising a joiner device with a first downstream leg connected to the network connection, a second downstream leg connected to the cable carrying television signals in the first frequency band, and with an upstream leg connected to an upstream cable carrying both television signals and data pertaining to communications with the set of at least two client modems.

3. The architecture of claim 1 wherein a first network access device is in communication with a first central modem which is in communication with a first diplexer and a second diplexer, the first diplexer connected to an output of one of the at least one signal amplifiers and to a first distribution network with a first set of client modems, the second diplexer connected to an output of one of the at least one signal amplifiers and to a second distribution network with a second set of client modems.

4. The architecture of claim 1 wherein a first network access device is in communication with:
   a) a first central modem which is connected to a first diplexer, the first diplexer connected to an output of one of the at least one signal amplifiers and to a first distribution network with a first set of client modems; and
   b) a second central modem which is connected to a second diplexer, the second diplexer connected to an output of one of the at least one signal amplifiers and to a second distribution network with a second set of client modems.

5. The architecture of claim 4 wherein the first network access device and the second network access device are cable modems which access the Internet through a connection located at a cable head-end.

6. The architecture of claim 1 wherein one network access device is in communication with a the hub; wherein the hub further comprises a central server, the central server is in communication with:
   a) a first central modem which is connected to a first diplexer, the first diplexer connected to an output of one of the at least one signal amplifiers and to a first distribution network with a first set of client modems; and b) a second central modem which is connected to a second diplexer, the second diplexer connected to an output of one of the at least one signal amplifiers and to a second distribution network with a second set of client modems;

such that one central server serves at least two distribution networks.

7. The architecture of claim 6 wherein the central server acts as a proxy server in order to connect the set of at least two client modems to the one network access device.

8. The architecture of claim 1 wherein the hub converts downstream data into a frame format in accordance with a recognized standard for encoding video signals for transmission over communications networks.

9. The architecture of claim 8 wherein the hub converts downstream data into MPEG2/DVB frames and uses MPEG Packet Identification codes to indicate whether the frame carries digital video.

10. The architecture of claim 1 wherein at least two network access devices are connected to a first router, the first router is connected to a second router, and the second router is connected to:

a) a first hub which is connected to a first diplexer, the first diplexer connected to an output of one of the at least one signal amplifiers and to a first distribution network with a first set of client modems; and b) a second hub which is connected to a second diplexer, the second diplexer connected to an output of one of the at least one signal amplifiers and to a second distribution network with a second set of client modems.

11. The architecture of claim 10 wherein the first network access device is connected to a first external network and the second network access device is connected to a second network.

12. The architecture of claim 1 wherein the hub adds a control field to data sent downstream targeted for a specific client, the control field indicating the strength of a previous upstream transmission from the targeted client modem.

13. The architecture of claim 1 wherein the hub adds local value-add functions so that the in-building local coax distribution network is provided television signals, Internet Protocol data from the external network, and local value-add functions.

14. The architecture of claim 13 wherein the local value-add functions are services selected from the group consisting of digital video on demand services and telephony services.

* * * * *